Patented May 23, 1939

2,159,191

UNITED STATES PATENT OFFICE 2,159,191

PROCESS FOR THE MANUFACTURE OF LEVO-ASCORBIC ACID

Wilhelm Wenner, Basel, Switzerland, assignor to Hoffmann-La Roche Inc., Nutley, N. J., a corporation of New Jersey No Drawing. Application May 26, 1936, Serial No. 81,963. In Germany June 6, 1935

8 Claims. (Cl. 260—344)

The synthetic production of the physiologically important levo-ascorbic acid (vitamin C) has been performed by allowing hydrocyanic acid to react with levo-xylosones (Swiss Patent No. 169,855). It was also found possible to convert 2-keto-levo-gulonic acid and its esters into levo-ascorbic acid by treatment with acids or alkaline agent (Helvetica Chimica Acta 17, 1933, pages 315 and 317).

It has now been found that levo-ascorbic acid may be obtained directly from the esters of the bis-methylene-ethers of 2 keto-levo-gulonic acid, that is to say from the intermediates in the manufacture of 2-keto-levo-gulonic acid, if these compounds are heated with acid agents. In addition to the esters of diacetone-2-keto-levo-gulonic acid the esters of the benzaldehyde- and ethyl-methyl-ketone-compounds were likewise found to be suitable as bis-methylene-ethers; as acid agents hydrochloric acid, sulphuric acid, potassium-bisulphate, oxalic acid or formic acid may be used. This process represents an advantageous method for obtaining levo-ascorbic acid. The conversion of the bis-methylene-ethers of 2-keto-levo-gulonic acid into the esters is easy. Under the influence of the acid agents the ether groups are removed, the ester is hydrolyzed and the compounds are directly converted into ascorbic acid. The course of the conversion of the esters of the bias-methylene-ethers of 2-keto-levo-gulonic acid is not yet fully clear. It does not proceed over the free 2-keto-levo-gulonic acid. It may be assumed that first two of the methylene-ether linkages are severed, whereupon the alcohol group is split off and the lactone ring closed. At the same time or subsequently the remaining two ether linkages are severed.

The type of alcohol used for the esterification of the bis-methylene-ether compound of 2-keto-levo-gulonic acid is of minor importance. The reaction is successful alike with basic and with neutral esters.

Example 1

15 parts by weight of diacetone-2-keto-levo-gulonic-acid-allyl-ester are boiled with 500 parts by weight of 18% hydrochloric acid for 10 minutes. The product is cooled and its content of levo-ascorbic acid is determined. About 90% of the starting material should be converted. If this is the case, then a solution of sodium hydroxide is added until the solution is but slightly acid to congo, whereafter it is evaporated to 100 parts by volume and filtered from the precipitated common salt. The solution is then evaporated to dryness, the residue dried and boiled with 70 parts by weight of methylalcohol. The methyl-alcoholic solution is filtered and evaporated to 20 parts by volume. On cooling levo-ascorbic acid is precipitated. After one recrystallization from water it is obtained pure.

Example 2

15 parts by weight of diacetone-2-keto-levo-gulonic-acid-allyl-ester are heated to boiling point with 500 parts by weight of 20% sulphuric acid. After 20 minutes 75% of the starting material will be converted into levo-ascorbic acid. The solution is worked up as described in Example 1.

Example 3

A 10% solution of potassium-bisulphate is used for the conversion. After 5 hours' boiling 45% of the theoretically possible quantity of levo-ascorbic acid will have been obtained which is isolated as described in Example 1.

Example 4

15 parts by weight of the bis-methyl-ethyl-ketone-2-keto-levo-gulonic-acid-allyl - ester are dissolved in 150 parts by weight of 50% formic acid and heated in a boiling water-bath. After 7 hours 44% of the ester are converted into ascorbic acid. The product is evaporated in vacuo and the levo-ascorbic acid is obtained from the residue by recrystallization from alcohol.

Example 5

28.8 parts by weight of diacetone-2-keto-levo-gulonic-acid-methyl-ester are dissolved in a mixture of 80 parts by weight of chloroform and 30 parts by weight of 80% ethyl-alcohol into which 3.3 parts by weight of hydrochloric acid gas had been passed. The product is boiled under a reflux condenser for 50 hours while stirring. Soon the levo-ascorbic acid begins to be precipitated in crystalline form. After 50 hours the liquid is removed by suction and the product washed with a mixture of chloroform and alcohol. The 13.58 parts by weight of levo-ascorbic acid thus obtained are proved by titration with iodine solution to be 98% pure. The yield of precipitated levo-ascorbic acid is therefore 75.5% of the theoretical quantity. The mother liquors contain 1.07 parts by weight of dissolved levo-ascorbic acid, so that a total of 81.5% of the theoretical quantity is obtained.

Example 6

15.4 parts by weight of diacetone-2-keto-levo-gulonic-acid-diethylamino-ethyl-ester are dissolved in 24 parts by weight of 18% hydrochloric acid and heated for 3 hours to boiling point. After this time 73% of the starting material will be converted into levo-ascorbic acid. After cooling the product is neutralized with the calculated quantity of sodium hydroxide solution and evaporated in vacuo to complete dryness. The dry residue is treated with 70 parts by weight of hot methyl alcohol, filtered from the common salt, a little methyl alcoholic hydrochloric acid is added and the product boiled under a reflux condenser for 3 hours. On cooling there will be a slight precipitate which is removed. The filtrate is evaporated to a syrupy consistency, after which the levo-ascorbic acid slowly crystallizes. It is recrystallized from water.

I claim:

1. The process for the manufacture of levo-ascorbic acid, which consists in heating esters of the bismethylene-ethers of 2-keto-levo-gulonic acid with acid agents which are free from oxidizing action.

2. The process for the manufacture of levo-ascorbic acid, which consists in heating esters of the bismethylene-ethers of 2-keto-levo-gulonic acid with acid agents which are free from oxidizing action in a diluent.

3. The process for the manufacture of levo-ascorbic-acid, which consists in heating esters of the bismethylene-ethers of 2-keto-levo-gulonic acid with hydrochloric acid.

4. The process for the manufacture of levo-ascorbic acid, which consists in heating esters of the bismethylene-ethers of 2-keto-levo-gulonic acid with hydrochloric acid in a diluent.

5. The process for the manufacture of levo-ascorbic acid, which consists in heating di-acetone-2-keto-levo-gulonic-acid-methyl-ester with acid agents which are free from oxidizing action.

6. The process for the manufacture of levo-ascorbic acid, which consists in heating di-acetone-2-keto-levo-gulonic-acid-methyl-ester with acid agents which are free from oxidizing action in a diluent.

7. The process for the manufacture of levo-ascorbic acid, which consists in heating di-acetone-2-keto-levo-gulonic-acid-methyl-ester with hydrochloric acid.

8. The process for the manufacture of levo-ascorbic acid, which consists in heating di-acetone-2-keto-levo-gulonic-acid-methyl-ester with hydrochloric acid in a diluent.

WILHELM WENNER.